United States Patent [19]

Obermann et al.

[11] Patent Number: 4,581,944

[45] Date of Patent: Apr. 15, 1986

[54] ELECTRONIC FLOW TRANSDUCER ASSEMBLY

[75] Inventors: George Obermann, Niles; Lui M. Lee, Melrose Park, both of Ill.

[73] Assignee: Controls Company of America, Schiller Park, Ill.

[21] Appl. No.: 713,166

[22] Filed: Mar. 18, 1985

[51] Int. Cl.[4] .............................................. G01F 1/38
[52] U.S. Cl. ................... 73/861.47; 73/861.52
[58] Field of Search ........... 73/861.47, 861.48, 861.63, 73/861.52, 766, 756, DIG. 3

[56] References Cited

U.S. PATENT DOCUMENTS

| | | | |
|---|---|---|---|
| 1,652,941 | 12/1927 | Isaac | 73/861.47 |
| 2,186,872 | 1/1940 | Klein | 73/741 |
| 2,406,181 | 8/1946 | Wiegand . | |
| 2,521,244 | 9/1950 | Moore, Jr. . | |
| 2,886,968 | 5/1959 | Johnson et al. . | |
| 4,005,847 | 2/1977 | Ekman | 73/756 |
| 4,212,200 | 7/1980 | Rousseau et al. | 73/861.47 |
| 4,487,074 | 12/1984 | Herden | 73/DIG. 3 |
| 4,507,976 | 4/1985 | Banito | 73/DIG. 3 |

Primary Examiner—Herbert Goldstein
Attorney, Agent, or Firm—David L. Davis; Robert E. Smith; Edward L. Bell

[57] ABSTRACT

A flow rate sensor including a diaphragm having a first side in fluid communication with a Venturi and a flow conduit. With flow through the conduit, the diaphragm travels downwardly, the extent of travel being determined by the flow rate. A permanent magnet assembly is coupled to the second side of the diaphragm for movement therewith and a Hall effect sensor assembly is fixed on the housing along a line which is an extension of the line of travel of the permanent magnet. Accordingly, the output from the Hall effect sensor is related to the distance between the magnet and the sensor and, thus, to the flow rate through the conduit. In order to prevent fluid from backing up into the vacuum area under the diaphragm when fluid flow is stopped, a check valve is interposed between the Venturi and the diaphragm. The check valve includes a ball having a lower density than the fluid which cooperates with a valve seat in the passageway leading to the diaphragm.

4 Claims, 3 Drawing Figures

ELECTRONIC FLOW TRANSDUCER ASSEMBLY

BACKGROUND OF THE INVENTION

This invention relates to apparatus for measuring the rate of flow of a fluid through a conduit and, more particularly, to such apparatus which provides an electronic signal compatible with present day electronic controls.

There are many applications where it is desired to control the flow of a fluid through a conduit in order to fill a container with a desired amount of the fluid. For example, in an appliance such as a clothes washing machine, the user may select a desired water level depending upon the size of the load being washed. It is conventional to provide such control through electromechanical technology that provides fill level control through pressure switches, time fill or through limit switch control by a float. With the advent of microcomputer control of appliances, many of the control functions previously handled by electromechanical devices have been taken over by the microcomputer. It would be desirable for the microcomputer to control the water level in such an appliance. It is therefore an object of the present invention to provide apparatus through which a microcomputer based system can control fluid level.

Fluid level can be directly measured in a number of ways such as, for example, by providing a plurality of level sensors at different levels of the fluid container. However, it would be desirable to reduce the number of required sensors and to be able to take advantage of the computing power of the microcomputer. Since fluid level may also be measured by knowing the rate at which fluid enters the container and then integrating this rate with respect to time, only a single flow rate sensor coupled between a conduit feeding the container and the microcomputer is required. It is therefore a further object of this invention to provide a fluid flow rate sensor.

SUMMARY OF THE INVENTION

The foregoing and additional objects are attained in accordance with the principles of this invention by providing a flow transducer assembly for providing a signal related to the rate of flow of fluid through a conduit comprising means for providing a restriction in the conduit, a housing having a chamber formed therein, a diaphragm sealing the chamber, and means for providing communication between the chamber and the conduit in the vicinity of the restriction. There is further provided an actuator rod outside the chamber, the actuator rod having opposed ends with the first of the ends being coupled to the diaphragm for movement in unison therewith. A Hall effect transducer is mounted outside the chamber and a magnet is mounted on the second end of the actuator rod for movement in unison with the actuator rod, the magnet being so positioned that the distance between the magnet and the Hall effect transducer changes as the diaphragm moves. A one-way check valve assembly within the communication means prevents the flow of fluid into the chamber.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figures 1, 2:
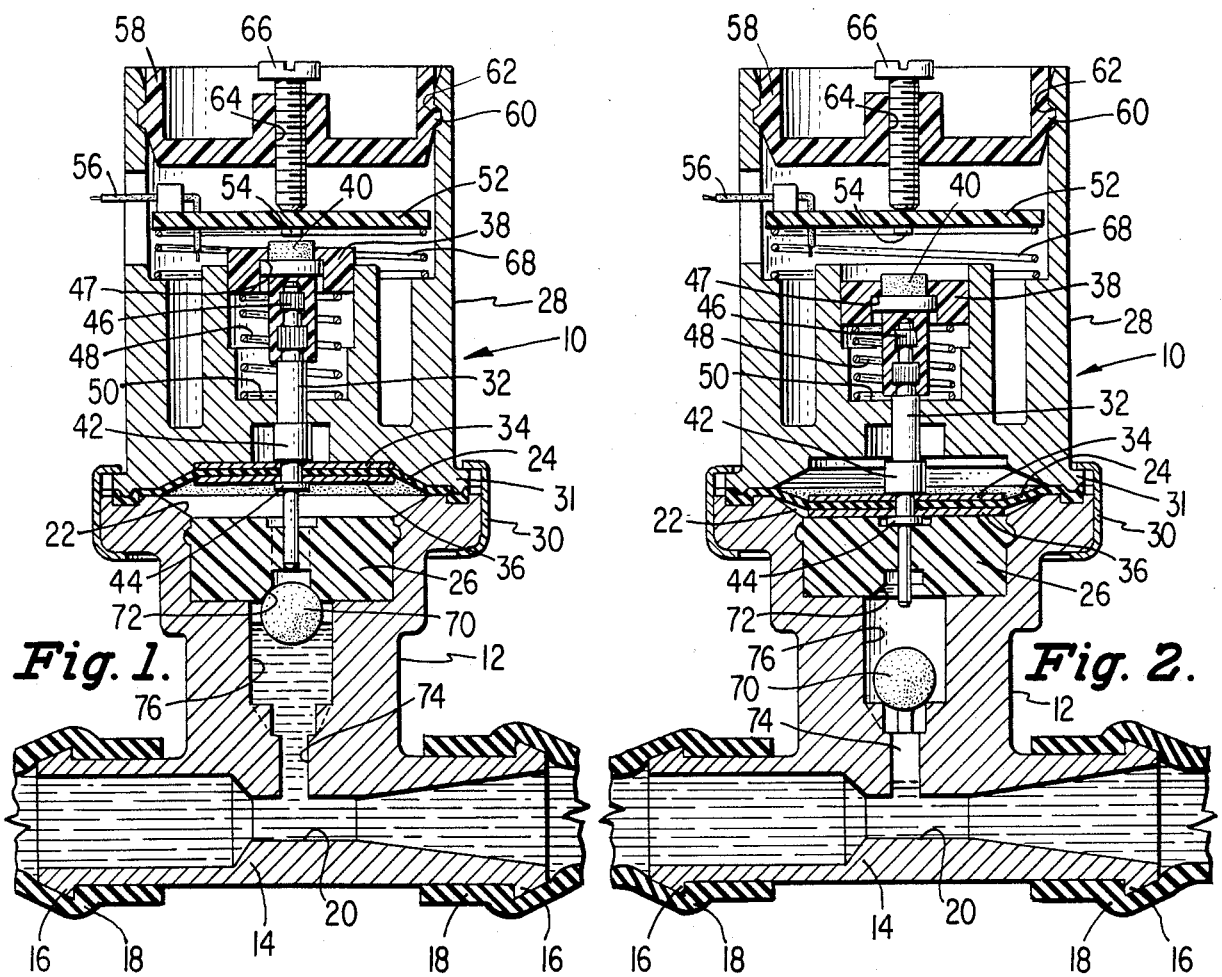
FIG. 1 is a longitudinal cross section of an assembly constructed in accordance with the principles of this invention, depicting the condition of no fluid flow through the conduit.
FIG. 2 is a view similar to FIG. 1 showing the condition of substantially maximum flow rate.

Referring now to the drawings, FIGS. 1 and 2 are cross sectional views showing the assembly, designated generally by the reference numeral 10, constructed in accordance with this invention. The assembly 10 includes a molded housing 12 which includes a conduit portion 14 having tapered outwardly extending flanges 16 at both ends thereof. The flanges 16 are adapted to hold in place hoses 18 of the appliance being controlled and into which hoses 18 the ends of the conduit portion 14 are inserted. The inside of the conduit portion 14 is so shaped as to provide a restriction 20 to fluid flow through the conduit portion 14, the assembly being designed for fluid flow from right to left, when viewed as in FIGS. 1 and 2, it being understood that if the inlet and outlet tapers are both the same and smooth, then the assembly is reversible.

The housing 12 is formed with a chamber 22 at its upper end, which chamber is sealed by a diaphragm 24, as will be described in full detail hereinafter. A plug 26 fills the lower portion of the chamber 22. Open passages are provided through the housing 12 and the plug 26 so that there is communication between the chamber 22 and the restriction 20. When the housing 12 is assembled, the chamber 22 is filled with whatever fluid is in the assembly area, illustratively air. In any event, this other fluid must be of less density than the conduit fluid in order for the assembly to operate.

The assembly 10 also includes an upper housing 28 attached to the housing 12 by means of a clamping ring 30 which is crimped over shoulders 29 and 31 on the housings 12 and 28, respectively, to trap the diaphragm 24 therebetween. The diaphragm 24 is part of a diaphragmactuator rod subassembly which includes the diaphragm 24, the actuator rod 32, diaphragm plates 34 and 36, magnet holder 38 and magnet 40. The diaphragm plates 34 and 36 and the diaphragm 24 are secured to the actuator rod 32 by abutting an enlarged region 42 of the actuator rod 32 and by being staked at 44 on the side opposite the enlarged region 42. The magnet holder 38 is press fit onto the knurled end 46 of the actuator rod 32 and the magnet 40 is laterally inserted into the magnet holder 38 and captured by the inverted lip 47 thereof. A spring 48, captured between the magnet holder 38 and the floor 50 of the housing 28 urges the diaphragm-actuator rod subassembly upward.

Figure 3:
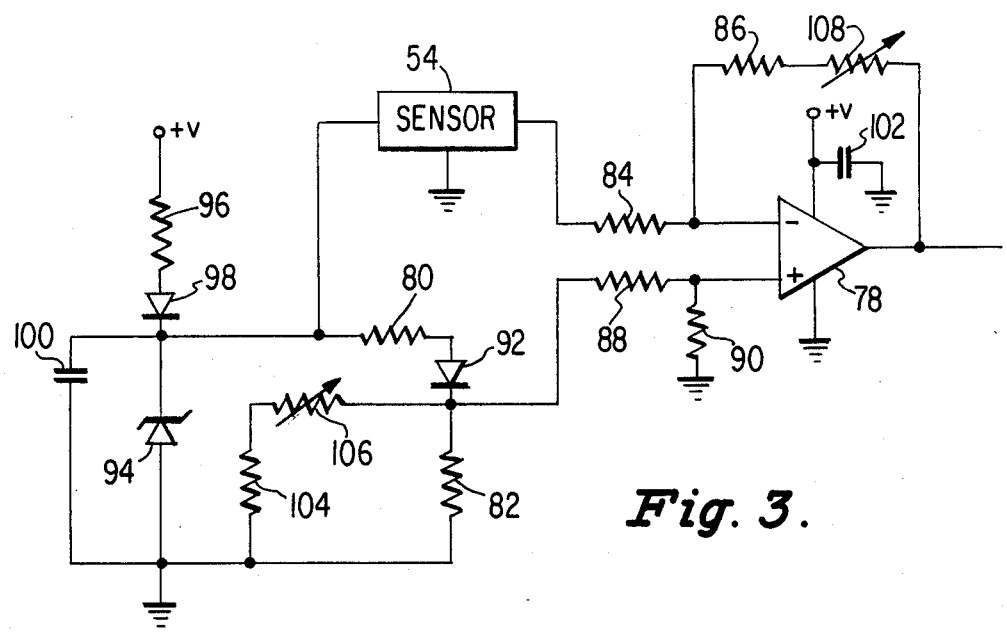
FIG. 3 is a schematic circuit diagram of illustrative circuitry for use with the assembly constructed in accordance with the principles of this invention.

The assembly 10 also includes a printed circuit board 52 on which is mounted a Hall effect transducer 54, preferably along the line of movement of the magnet 40. Circuitry, such as that illustrated in FIG. 3, is mounted on the board 52 and connected to the terminals 56. An end cap 58 seals the upper housing 28 and is held in place by an outwardly extending shoulder ring 60 which snaps into a groove 62 on the upper housing 28. The end cap 58 has an internally threaded bore 64 for accommodating an adjusting screw 66 therethrough.

The screw 66 pushes downwardly against the board 52 and is opposed by the spring 68. The adjusting screw 66 is utilized to calibrate the circuitry by changing the gap between the magnet 40 and the sensor 54.

The assembly 10 also includes a check valve situated within the communication channel between the chamber 22 and the restriction 20. This check valve comprises a valve element 70 and a valve seat 72 formed on the plug 26. The valve element 70 is preferably a ball of density less than that of the fluid flowing through the conduit portion 14. The purpose of the check valve is to prevent the conduit fluid from backing up into the vacuum area in the chamber 22 under the diaphragm 24 when fluid flow is stopped. Therefore, the density of the ball 70 is greater than the density of the other fluid.

The assembly 10 operates on the well known Venturi principle that when fluid flows through a restricted area, a pressure differential is obtained. Accordingly, when conduit fluid flows through the restriction 20, a relative vacuum is created in the passageway 74. This causes the diaphragm 24 to travel down, as shown in FIG. 2, moving the magnet 40 away from the sensor 54. The separation between the magnet 40 and the sensor 54 is controlled by the pressure differential, which is controlled by the flow rate, and the force exerted by the spring 48 opposing the separation. FIG. 2 illustrates the limit of the stroke of the diaphragm-actuator rod subassembly. When there is no fluid flow through the conduit portion 14, as depicted in FIG. 1, fluid backs up into the chamber 76. Since the density of the ball 70 is less than the density of the conduit fluid, the ball 70 floats on the conduit fluid toward the top of the chamber 76. If the conduit fluid level rises high enough, the ball 70 seats against the valve seat 72, preventing conduit fluid from backing up into the chamber 22.

FIG. 3 shows a schematic diagram of illustrative electronic circuitry mounted on the printed circuit board 52 and connected to the terminals 56. This circuitry amplifies the output of the transducer (or sensor) 54. Preferably, the magnet 40 is magnetized in the direction along which it travels toward and away from the sensor 54 so that the sensor 54 operates in what is known as the unipolar head-on mode of operation. The basic equation describing the interaction of the magnetic field and current resulting in a Hall voltage ($V_H$) for a practical Hall element is:

$$V_H = K \times I_c \times B \text{ SIN } \theta$$

where:
the constant K is a function of the geometry of the Hall element;
$I_c$ is the input current; and
B SIN $\theta$ is the magnetic flux density.
If the input current is held constant, then the Hall voltage will be directly proportional to the perpendicular component of the magnetic field. This output Hall voltage is usually small and requires additional electronics to achieve a useful voltage level. Illustrative electronics is shown in FIG. 3.

As shown in FIG. 3, the change in the transducer 54 voltage is fed into one input of the operational amplifier 78, the other input of which is fed with a reference voltage set by the resistors 80, 82, 104 and 106. The operational amplifier 78 acts as a differential amplifier which amplifies the difference of the two input signals by a gain factor set by the resistors 84, 86, and 108. The resistors 88 and 90 are used to set the operational amplifier 78 to act as a differential amplifier and at the same time to minimize the output offset level. Therefore, by properly selecting the resistors 80, 82, 84, 86, 88, 90, 104, 106 and 108, a desired operational output for a given flow rate is achieveable. By doing so, a range of outputs for a given range of flow rates can be obtained. Based on this data, a graph of output voltage versus flow rate may be plotted. Since the Hall sensor output at different magnetic flux densities is repeatable, the graph data may be entered into a computer for further processing. Therefore, by seeing the voltage output of the amplifier 78, the computer will be able to tell what the flow rate is. This measured flow rate can then be used to control a volumetric filling process by either shutting a valve or displaying the fluid volume obtained.

In the circuit of FIG. 3, the diode 92 is used to temperature compensate for output drifting of the sensor 54 which has a positive temperature coefficient when exposed to the north pole of the magnet 40. The zener diode 94 is used to regulate the supply for the sensor 54 as well as the reference voltage source. The zener current is limited by the resistor 96 and the diode 98 is used to compensate for temperature drifting of the zener voltage. The bypass capacitors 100 and 102 are used for filtering and preventing oscillation in electrically noisy environments. The resistor 104 and the trim pot 106 are used for adjusting the reference voltage fed through the operational amplifier 78. The trim pot 108 is used to adjust the gain factor of the amplifier 78.

Accordingly, there has been disclosed an improved electronic flow rate measuring assembly. It is understood that the above-described embodiment is merely illustrative of the application of the principles of this invention. Numerous other embodiments may be devised by those skilled in the art without departing from the spirit and scope of this invention, as defined by the appended claims.

We claim:
1. A flow transducer assembly for providing a signal related to the rate of flow of a fluid through a conduit comprising:
   means for providing a restriction in said conduit;
   a housing having a chamber formed therein;
   another fluid in said chamber of a density less than that of said conduit fluid;
   a diaphragm sealing said chamber;
   means for providing communication between said chamber and said conduit in the vicinity of said restriction;
   an actuator rod outside said chamber and having opposed ends with a first of said ends being coupled to said diaphragm for movement in unison therewith;
   a Hall effect transducer mounted outside said chamber;
   a magnet mounted on the second end of said actuator rod for movement in unison therewith, said magnet being so positioned that the distance between said magnet and said Hall effect transducer changes as said diaphragm moves; and
   a one-way check valve assembly within said communication means for preventing the flow of only said conduit fluid into said chamber, said check valve assembly including a valve element of density less than that of said conduit fluid and greater than that of said other fluid.

2. The assembly according to claim 1 wherein said valve element is a ball.

3. The assembly according to claim 1 wherein the line of movement of said magnet passes through said Hall effect transducer.

4. The assembly according to claim 3 wherein said magnet is magnetized along its line of movement.

* * * * *